United States Patent [19]

Clagett

[11] Patent Number: 5,121,126
[45] Date of Patent: Jun. 9, 1992

[54] BEACON ENHANCED TELECOMMUNICATIONS SYSTEM AND METHOD

[75] Inventor: Donald J. Clagett, Rockville, Md.

[73] Assignee: Bell Atlantic Network Services, Inc. Arlington, Va.

[21] Appl. No.: 667,990

[22] Filed: Mar. 12, 1991

[51] Int. Cl.$^5$ .................................................. G01S 5/02
[52] U.S. Cl. ...................................... 342/419; 379/59
[58] Field of Search ...................... 342/419; 379/58, 59, 379/60; 455/56, 54, 67

[56] References Cited

U.S. PATENT DOCUMENTS 4,907,290  3/1990  Crompton ............................ 455/56

Primary Examiner—Mark Hellner
Attorney, Agent, or Firm—Dennis P. Monteith

[57] ABSTRACT

A public switched telecommunications network including a beacon transmitter associated with a station in such network and transmitting periodic beacon signals containing information regarding the location of said beacon and station. A portable receiver is provided for receiving such information and reproducing such location information to permit the carrier of said receiver to locate said station. The location information may be visually or audibly reproduced. The station may be a public pay station and/or a cellular station. The receiver may be associated with a portable cellular transceiver for establishing communications with a cellular transceiver disposed adjacent the beacon.

20 Claims, 2 Drawing Sheets

BEACON ENHANCED TELECOMMUNICATIONS SYSTEM AND METHOD

TECHNICAL FIELD

The invention relates to telecommunications services and systems and more particularly to systems and services which provide freedom from certain limitations and constraints inherent in existing conventional public switched telephone networks.

BACKGROUND OF THE INVENTION

Telecommunications systems and services today are in an era of rapid evolution aimed at providing alternatives to the wired public switched telephone network (PSTN). Most of the proposed alternatives to the conventional subscriber PSTN provide an added degree of mobility to telephone usage. Some of the presently existing options include:

1. So-called cordless telephones for use in and around the residence or workplace for both call origination and call reception.
2. Cellular telephones which were initially provided in automobiles over large areas but were generally limited to low traffic per unit area. Cellular telephones provide two-way but predominantly subscriber originated communications.
3. Conventional pay phones which provide islands of public access to the PSTN. Pay phones provide one-way calling for practical purposes.
4. Paging is a widely available service which serves an area as large as necessary. Generally speaking the communication is one-way to the subscriber customarily signals the subscriber to go to a telephone.

In addition to the foregoing existing services the objectives of enhanced mobility and multi-service terminals are now being addressed by two proposed new services, namely, telepoint and Personal Communications Networks (PCNs).

Telepoint in essence comprises an extension of the cordless telephone. The first generation of such service provides primarily call initiation and not complete two-way service. The telepoint subscriber is provided with a cordless handset which may be used within a predetermined range (presently about 100 yards) from a phone point which may constitute a home, office or public pay telephone. Phone point base stations can be sited in both indoor and outdoor public locations such as airports, railway stations, shopping centers, highways, etc., to allow authorized users to make telephone calls.

In use of such telepoint service the caller turns his/her handset on anywhere within the predetermined distance from a base station and presses the key sequence to access the base station. The handset then establishes a radio link with the base station. The handset also transmits to the base station stored authorization details or data. The base station in turn checks the authorization data and may prompt the user to manually enter a Personal Identification Number (PIN), if required. The base station checks that the PIN algorithmically matches the authorization data and that the authorization data is not on a locally held reject list. The caller is then prompted to dial the number he/she requires. The base station analyzes the dialed digits and decides if the call requires more detailed central authentication. If the caller is not authorized, as where the handset was stolen, the handset may be disabled by the base station so that it cannot be used again. If the call is authorized, the base station sets up the call via the PSTN.

The base station notes the time and date when the called subscriber answers and monitors the duration of the call. When the calling subscriber terminates the call the base station stores the call data such as the authorization details, date and time of call, call duration and dialed digits, etc., for later transmission to the central system for billing. A regional controller responsible to phone point management maintains a continuous surveillance on the system via the PSTN. Calls can either be billed directly to customers from the administration center or forwarded to the relevant network operator or program for billing.

A second proposed service, which is generally referred to as a Personal Communications Network (PCN), is a personal, totally portable, wireless communications network. PCN features a light weight, wallet sized cordless telephone connected to other telephones on and off the wireless network via a honeycomb of radio based microcells supported by an intelligent network, together with state of the art modulation techniques. PCN is intended to offer advanced voice and data communications totally independent of, or in tandem with, the PSTN. This new service is proposed to operate within a portion of the spectrum in the 1.7 to 2.3 GHz range. PCN is a generation beyond mobile phones as known in the cellular service today. Because it will use microcells which will greatly expand frequency use and reuse PCN will be available to greater masses of users. Because of its intelligent network it is proposed that personalized "smart cards" be provided to offer advanced service features such as highly selective call ringing and rejection, virtual private networks and ISDN features.

Such PCN service is not presently available in the United States but has been provided on a limited basis in the United Kingdom. However, PCN's spectrum demands and ubiquity require a large allocation of dedicated spectrum which is likely to entail delay in wide scale introduction of such a service in the United States.

While the movement toward these new and advanced services is in progress there remains a pressing need for immediate enhancement of the services which the PSTN is capable of providing. It is a purpose of the present invention to supply that need both on an immediate and long term basis.

DISCLOSURE OF THE INVENTION

There are many instances when a traveler or other transient individual has the need to place a telephone call from a public phone. In such cases, the person must first assume that a public telephone is nearby and then proceed to physically search for the phone in order to place his/her call. This situation also arises in cases where users must find a public telephone to respond to a page.

As new public access services, such as telepoint, evolve this problem could become even more pronounced. For example, the transmitted power used for telepoint services will be limited by spectrum usage and concerns regarding radio frequency interference and congestion. Users of telepoint services seeking to locate a base station will be in need of some means of location of the base station to permit the telepoint subscriber to approach sufficiently close to complete a call.

According to the present invention, in order to assist individuals in such circumstances, the relevant telephone or base station is provided with a radio beacon capable of broadcasting simple pulse signals or more complex signals containing a variety of information messages. In simplest terms the base station will broadcast a signal which, in one way or another, says "Here I am."

The users of the new system and service may be provided with a highly portable receiver capable of being personally carried in the pocket or purse in the form of a credit card device, electronic calculator, electronic telephone directory device, watch, wristwatch, wristwatch band attachment, telephone paging receiver, or in or on an automobile. The radio beacon is arranged to provide the receiver with some type of indication of the approximate direction and distance or a city address or highway map location. The service may be arranged so that the transmitter responds to prompts or inquiries from the receiver. The radio beacon may be implemented in any portion of the radio spectrum, including infrared. The beacon service may be extended to include other vending type services, such as dispensing machines, bank teller machines, or even retail stores.

It is accordingly an object of the present invention to provide an enhanced telecommunications service via the public switched telephone network.

It is another object of the invention to provide a system for improving the effectiveness of the existing PCTN in a manner which may be utilized in conjunction with evolving technologies such as telepoint communications.

It is yet another object of the invention to provide a unique locating service which is effective for increasing the availability and utility of existing vending type installations such as vending machines, ATMs, retail establishments or the like.

It is another object of the invention to provide base stations such as public pay stations with a relatively high power pulse type radio beacon transmitter for communicating with subscribers carrying on their persons or in their vehicles portable receivers capable of deriving from the beacon signal an indication of the location of the base station.

It is still another object of the invention to provide such a beacon transmitter associated with a base station wherein the transmitter is used in conjunction with a subscriber carried portable transceiver capable of triggering the beacon transmitter into transmission and receiving an indication of its position.

It is yet another object of the invention to provide a beacon transmitter in association with a base station to provide a beacon signal to be received by a subscriber carried portable receiver having a visual presentation of alphanumeric and/or graphic characters for purposes of indicating the location of the base station.

It is still another object of the invention to provide a beacon transmitter in association with a base station for transmitting periodic signals for reception by subscriber carried portable receivers or transceivers having the capability of ascertaining their own geographic location and determining from the beacon signal the distance and direction to the base station.

It is yet another object of the invention to provide a beacon transmitter associated with a cellular telephone transceiver for transmitting a beacon signal for detection and read-out by subscriber carried portable receivers associated with cellular transceivers for indicating the location area within which cellular calls can be completed.

Other advantages of the invention will become apparent from a study of the following specification and claims and appended drawings wherein:

BEST MOST FOR CARRYING OUT THE INVENTION

Figure 1:
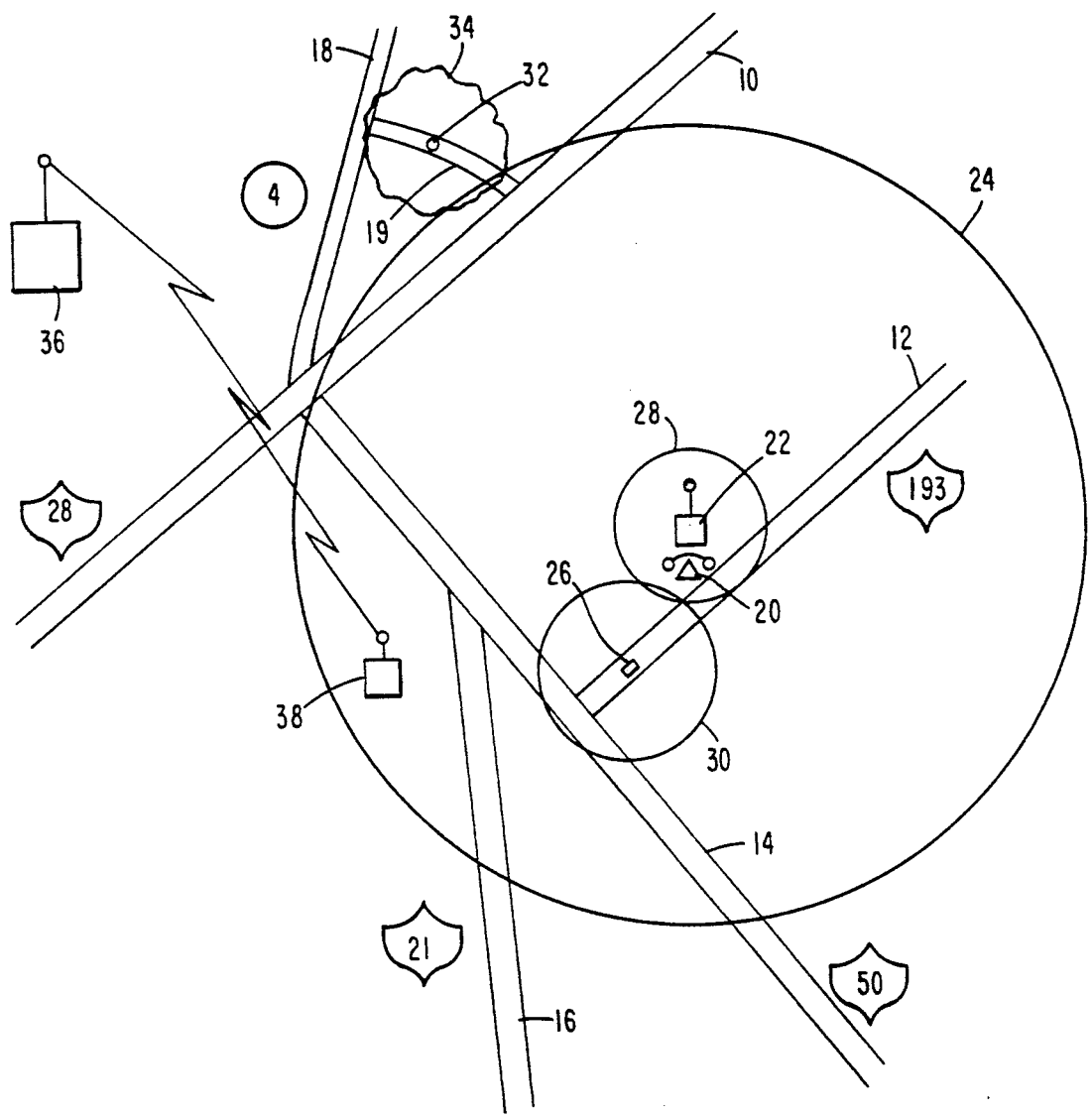
FIG. 1 is a map projection showing the disposition of a pay phone base station having a beacon according to the invention and the relation of the beacon to various types of users.

Referring to FIG. 1 there is shown a map-like projection of a geographic area traversed by roads or highways indicated at 10, 12, 14, 16, 18 and 19. The roads 10, 12, 14 and 16 are respectively marked as interstate highways 28, 193, 50 and 21. Road 18 is marked as state highway 4. Road 19 represents a local road and bears no numerical marking. A public pay phone or pay station 20 in the PSTN is located along the road 12 (highway 193) and is shown with a beacon transmitter or transceiver 22, according to the invention. The transmitter 22 transmits a beacon signal having a range indicated by the large circle 24.

The pay station 20 may be equipped to communicate with a telepoint transceiver 26 which may be carried by a vehicle. The effective range of the telepoint equipped pay station 20 may be as indicated by the small circle 28, whereas the range of the vehicle mounted telepoint transceiver 26 is indicated by the circle 30. As seen in FIG. 1 the telepoint transceiver 26 is positioned just within the limit of the range of the telepoint equipped pay station or phone 20 whereby communication between the two can be established.

Also illustrated in FIG. 1 is a subscriber carrying a receiver 32 constructed according to the invention and adapted to receive the beacon signal whose range limit is indicated at 24. The effective range of the receiver 32 is indicated at 34. As shown in FIG. 1 the receiver 32 is at the limit of the beacon 24 and can receive the beacon signal.

Also shown in FIG. 1 is a paging transmitter 36 which transmits a signal being detected by a paging receiver 38. The paging receiver 38 is within the range of the beacon 22 as indicated by the circle 24.

Assuming that the customer carrying the receiver 32 is desirous of making a pay phone call, the customer may turn the receiver on and the receiver will detect the beacon signal whose outer range is indicated by the circle 24. The beacon signal may comprise a pulse which carries information as to the location of the pay phone 20. Assuming a relatively simple receiver 32 in the form of a card or pager having a limited LCD display, this information might comprise a brief geographic indication such as "On I-193 2 MI NE I-50". Using a convention described in an instruction booklet associated with the receiver 32 this would be translated as "On Interstate 193 2 miles Northeast of intersection with Interstate 50". The customer using the receiver thereupon would have sufficient information to locate the nearest pay telephone for the purpose of completing his desired communication via the PSTN. The beacon signal is preferably of high power and short duration with a low data rate to use a minimum band-width in the available spectrum.

Figure 3:
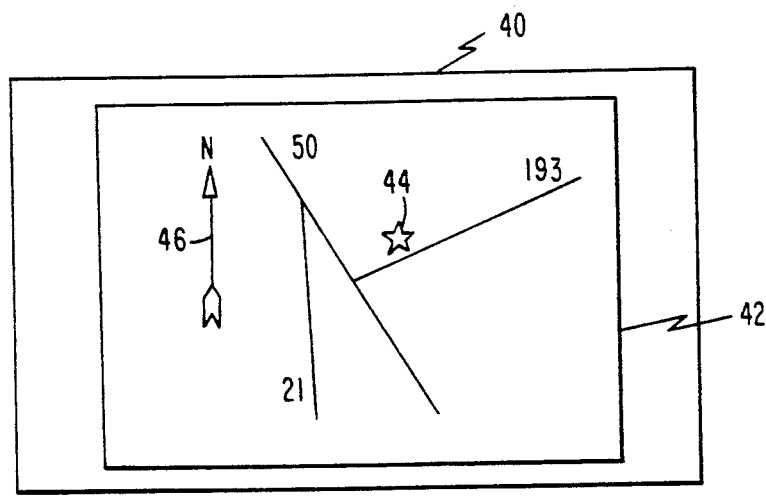
FIG. 3 is a plan view of a card configured receiver adapted to provide directions to a base station according to the invention.

According to another embodiment of the invention the receiver may be of a more sophisticated type illustrated by way of example in FIG. 3. Referring to that figure there is shown a receiver 40 in the form of a card or rectangular case such as may be provided for a pager. The face of the card or case is provided with an LCD screen 42 capable of displaying graphics and alphanumeric characters. According to this embodiment of the invention the transmitter 22 in FIG. 1 is transmitting a more complex pulse signal which has encoded therein data to produce a readout on the screen 42 which portrays a simplified depiction of the map in FIG. 1. Thus the graphic display on receiver 40 shows the highway numbers and the location of the beacon as indicated by the star 44. A compass direction designation is provided at 46. In this embodiment of the invention the customer is readily able to proceed immediately to the pay phone 20 to use that phone in the conventional coin or credit card manner.

If the customer is provided with a telepoint transceiver communication may be established by the customer proceeding to the point on Highway 193 shown in FIG. 1 wherein the effective ranges of the customer telepoint transceiver and base station telepoint transceiver at the pay phone 20 overlap. If the possessor of the card or receiver 40 is not equipped with a telepoint transceiver it will be necessary to proceed physically to the pay phone 20 to establish the desired communication in the conventional pay phone fashion.

According to another feature of the invention the display 42 illustrated in FIG. 3 may be provided as an integral part of the telepoint transceiver. Alternatively the card 40 may be provided in a so-called smart card format wherein the insertion of the card in an appropriately equipped pay phone performs authentication, security and billing functions.

While the indication of location of beacon transmitter and base station may be provided in alphanumeric or graphic form as above described the invention also comprehends the transmission and reception of a voice signal. According to this embodiment of the invention the same type of location indicating message, such as a street address or highway location, such as "On Interstate 193 2 MI NE of intersection with Interstate 50", may be used. This voice signal may be transmitted in real time or compressed by well known techniques for decompression by the receiver. In this instance the receiver includes an audio section for reproducing the voice signal. In those instances described herein where the beacon signal receiver is associated with a handset, such as with a telepoint or cellular transceiver, the audio signal is preferably reproduced by the available handset. In this audio embodiment it is also convenient to include in the signal promotional or advertising or other informational messages of short duration.

In the interest of conservation of spectrum and limitations of interference the beacon signal will normally be broadcast periodically and not on a continuous basis. According to another embodiment of the invention the receiver may be provided with a transmitting capability for triggering the beacon into a transmit mode. With this type arrangement an even greater conservation of spectrum and limitation of interference is provided.

Referring to FIG. 1 a pager receiver 38 is illustrated receiving a page message from a page transmitter 36. In the conventional situation the pager will be provided with the identification of a calling number and in more sophisticated instances with other information. In either event the pager user must locate and access a telephone in the PSTN in order to communicate with the calling party. According to the invention the pager 38 may be combined with a beacon receiver which will be actuated by the periodic signal from the beacon transmitter 22. Once this notification occurs the pager 38 is provided with information which will permit the user to locate and access a pay telephone in the PSTN.

According to another embodiment of the invention the pager receiver 38 may be provided as a transceiver with the ability to emit a signal which will trigger the beacon transmitter 22 to provide immediate information as to the location of the pay telephone. Still another alternative is to have the beacon transmitter 22 actuated by the signal from the page transmitter 36. In those instances where the pager 38 is provided in the form illustrated in FIG. 3 the pager user is directed in a detailed fashion to the public phone.

Figure 2:
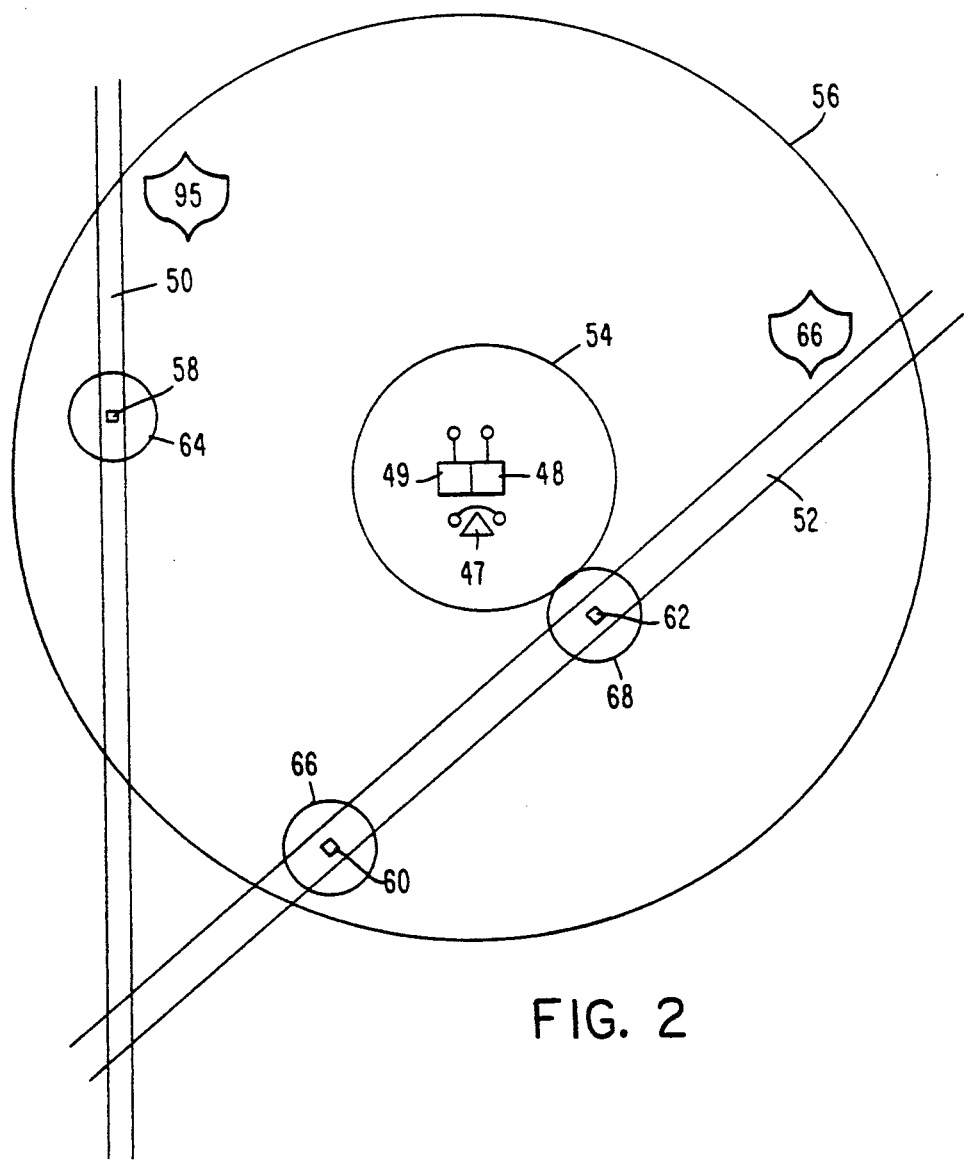
FIG. 2 is a map-like projection showing a cellular usage of the invention.

Referring to FIG. 2 there is shown yet another application of the invention to a cellular telephone system. Current cellular telephone systems in the United States provide excellent and virtually continuous coverage of metropolitan areas and considerable contiguous countryside. On the other hand there remain enormous rural or sparsely populated areas in which cellular service is unavailable.

Referring to FIG. 2 there is shown an embodiment of the invention which is capable of providing the cellular equivalent of the pay telephone in the PSTN. FIG. 2 shows an area which is crossed by interstate highways 50 and 52 (Interstate Highways 95 and 66 respectively) at a location which is beyond the range of any existing cellular system. The area which is beyond cellular service may be large in expanse wherein it is not contemplated that cellular service would be available within the foreseeable future.

According to the invention it is possible to provide limited cellular service by providing an interconnect to the PSTN. A pay telephone station 47 has located at its site a cellular transceiver 48 which is combined with a beacon transmitter 49. The area covered by the cellular transceiver 48 is indicated by the small circle 54 while the area covered by the powerful beacon transmitter 49 is indicated by the larger circle 56. Vehicles 58, 60 and 62 are shown traveling the highways 50 (I95) and 52 (I66). The area of coverage of the cellular transceivers in the vehicles is respectively indicated by the circles 64, 66 and 68.

The cellular transceivers in this instance are either integrally combined with beacon receivers or the customers or drivers are in the possession of a beacon receiver. In this instance the beacon transmitter 49 may perform the dual function of indicating to the cellular customers the presence of the cellular service area 54 while at the same time indicating to non-cellular customers who are possessed of beacon receivers the presence of a pay phone. For purposes of the cellular customers the presence of the pay phone is unnecessary so long as there is a base cellular station interconnected to the PSTN.

While the beacon signal is preferably of short duration its data content may vary. Similarly while the beacon receivers may be of a simple basic nature it is also possible that such receivers may be sophisticated and complex. Thus it is within the purview of the invention that the beacon transmitter may transmit a signal containing positional data such as latitude and longitude. The receiver in turn may include position determining circuitry such as Loran C which is capable of providing a range and bearing to the transmitter once its position is known. Alternatively the latitude and longitude of the beacon transmitter may be determined from a suitable chart or table or may be incorporated into the programming of the Loran C receiver. As a still further alternative the beacon transmitter station may be provided with radio direction finding capability to home in on a signal from the receiver (transceiver) and transmit a range and bearing to the receiver. Still other alternatives will be apparent to those skilled in the art and are included within the invention.

According to a still further embodiment of the invention the beacon signal may include advertising or promotional messages such as indicating the nearest location of various types of commercial establishments or facilities such as ATMs. As a still additional alternative beacons may be provided to locate facilities such as ATMs without connection to the PSTN.

In those instances in which the PSTN is accessed by a cordless, telepoint or cellular type phone it is necessary to provide identification of the caller for billing, security and identification purposes. According to the invention this may be accomplished by Telco issuance of smart cards containing such information, billing identification and security codes. Such cards may be adapted for insertion into the cordless, telepoint or cellular telephone whereby the necessary information is automatically transmitted in establishing the connection to the PSTN for completion of the desired communication. A still further feature of the invention entails providing the PSTN base station with a data port susceptible of coupling or connection to a handset carried by the customer and capable of transmitting and/or receiving data.

It will be apparent from the foregoing that the system and method of the invention provides for a significant enhancement of available telecommunications services through the PSTN without the necessity of awaiting sweeping regulational and spectrum control changes. The invention relies upon available technology and may be implemented with minimal hardware installation and/or change.

Still other objects and advantages of the present invention will become readily apparent to those skilled in this art from the foregoing description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

I claim:

1. In a telecommunications system including a switched telecommunications network having switching means interconnected by trunk means and station means linked to at least certain of said switching means, the improvement comprising;
    means for transmitting a radiated beacon signal associated with at least one of said station means from substantially the same site to radiate therefrom a periodic relatively short duration signal;
    said beacon signal including coded information regarding the geographic location of said means for transmitting said beacon signal and said one station means;
    portable receiving means for receiving said signal when within the range thereof;
    means associated with said receiving means and responsive to receipt of said signal for providing information regarding the location of said transmitting means; and
    means at said one station means for providing a connection to said switched telecommunications network.

2. A telecommunications system according to claim 1 wherein said one of said station means comprises a public pay telephone station means.

3. A telecommunications system according to claim 1 wherein said one of said station means comprises transceiver means for establishing a radiation link with said switched telecommunications network.

4. A telecommunications system according to claim 1 wherein said one of said station means includes a data port for establishing a data link with said switched telecommunications network.

5. A telecommunications system according to claim 1 wherein said receiving means is associated with a portable telephone station means capable of being linked to said one of said station means for communication via said switched telecommunications network.

6. A telecommunications system according to claim 5 wherein said portable telephone station means comprises cellular telephone means.

7. A telecommunications system according to claim 6 including cellular transmitter and receiver means disposed substantially at the site of said beacon transmitting means, wherein the range of said cellular transmitter and receiver means is less than the range of said beacon signal.

8. A telecommunications system according to claim 1 wherein said portable receiving means has associated therewith a display means for visually providing said information regarding the location of said transmitting means.

9. A telecommunications system according to claim 1 wherein said beacon signal contains audio information regarding the location of said transmitting means and said portable receiving means includes means for audibly reproducing said information.

10. A telecommunications system according to claim 1 wherein said portable receiving means is associated with a smart card for providing to said one of said station means customer identification and billing data.

11. A telecommunications system according to claim 1 wherein said beacon signal includes information in addition to information regarding the location of said transmitting means.

12. A method for establishing communications via a telecommunications system including a switched telecommunications network having switching means interconnected by trunk means and station means linked to at least certain of said switching means, the steps comprising:
    transmitting a periodic radiated beacon signal from the site of at least one of said station means;

including in said beacon signal coded information regarding the geographic location of said site of said one station means;

receiving said beacon signal with a portable receiving means;

providing at said receiving means in response to receipt of said beacon signal information regarding the location of said site of said one station means; and effecting connection to said switched telecommunications network at said one station means.

13. A method according to claim 12 wherein said connection to said switched telecommunications network is effected through a public pay telephone station.

14. A method according to claim 12 wherein said connection to said switched telecommunications network is effected through a radiation link.

15. In a cellular telecommunications network including multiple contiguous sets of cells connected to a switched telecommunications network having switching means interconnected by trunk means and station means linked to at least certain of said switching means, the improvement comprising;

cell transceiver means serving a cell spaced from and non-contiguous to said sets of cells;

beacon transmitter means located at said cell for transmitting periodic short duration beacon signals over a range extending substantially beyond the bounds of said cell served by said cell transceiver;

portable receiving means for receiving said beacon signal beyond said bounds of said cell;

means associated with said receiving means and responsive to receipt of said beacon signal for providing information regarding the location of said beacon transmitter means; and portable cellular transceiver means associated with said portable receiving means for providing a connection to said switched telecommunications network through said cell transceiver means.

16. A telecommunications network according to claim 15 wherein said portable cellular transceiver means establishes a connection to said switched telecommunications network through station means disposed substantially adjacent said cell transceiver means and said beacon transmitter means.

17. A telecommunications network according to claim 16 wherein said station means is a public pay station.

18. A telecommunications network according to claim 15 wherein said portable receiving means is associated with a display means for visually providing said information regarding the location of said beacon transmitter means.

19. A telecommunications system according to claim 15 wherein said portable cellular transceiver means is associated with a smart card for providing to said switched telephone communications network customer identification and billing data.

20. A telecommunications system according to claim 15 wherein said beacon signal includes information in addition to information regarding the location of said beacon transmitter means.

* * * * *